Oct. 18, 1960  G. N. BURKHART, JR  2,957,131
AUTOMATIC CALIBRATION FOR WATTHOUR METERS
Original Filed Aug. 15, 1955  4 Sheets-Sheet 1

INVENTOR.
George N. Burkhart, Jr.
BY
Louis Robertson
Jones, Darbo & Robertson Attys.

Oct. 18, 1960  G. N. BURKHART, JR  2,957,131
AUTOMATIC CALIBRATION FOR WATTHOUR METERS
Original Filed Aug. 15, 1955  4 Sheets-Sheet 3

INVENTOR.
George N. Burkhart, Jr.
BY
Louis Robertson
Jones, Darbo & Robertson Attys.

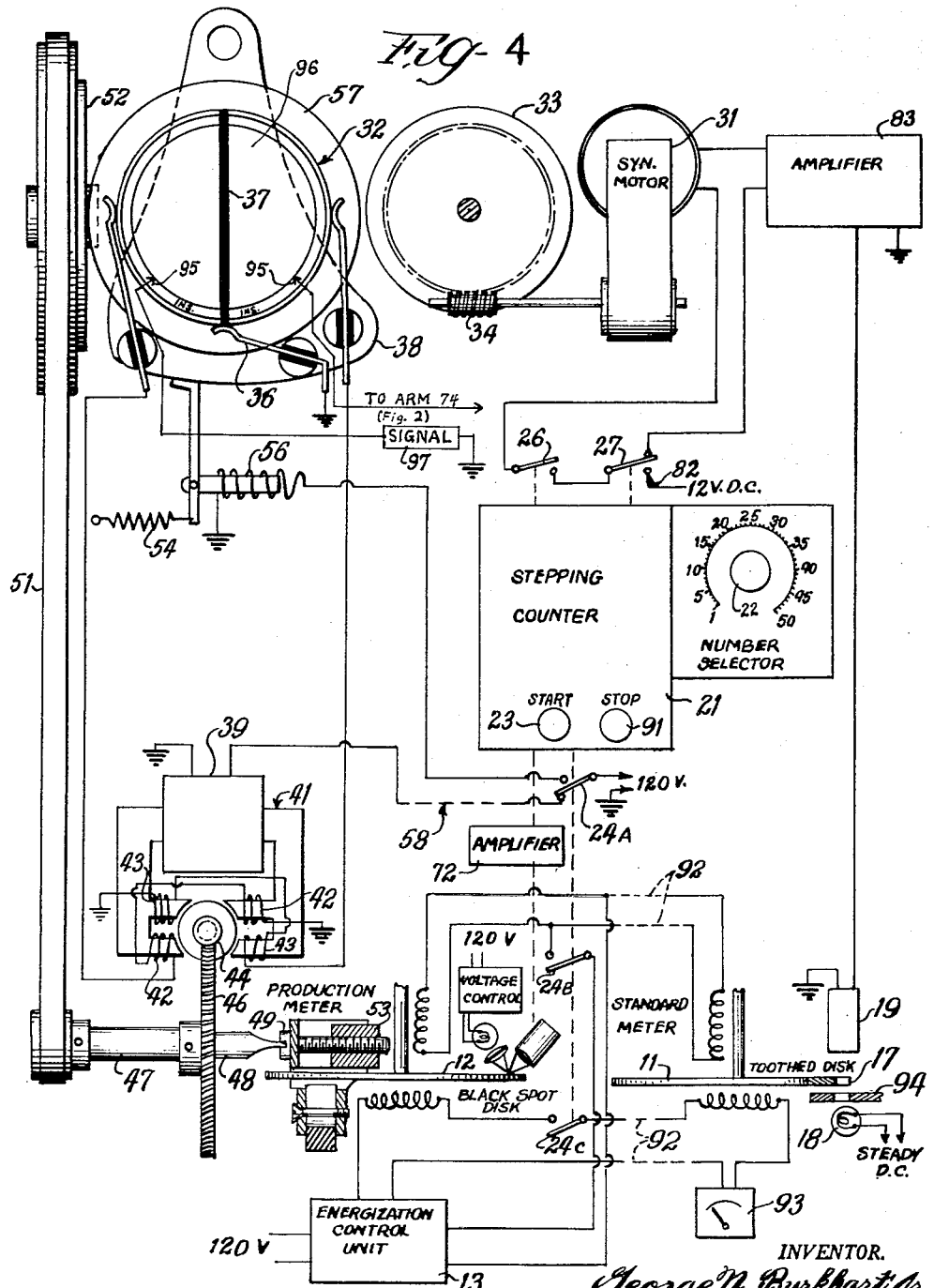

United States Patent Office 2,957,131
Patented Oct. 18, 1960

2,957,131

AUTOMATIC CALIBRATION FOR WATTHOUR METERS

George N. Burkhart, Jr., Brookston, Ind., assignor, by mesne assignments, to Duncan Electric Company, Inc., Lafayette, Ind., a corporation of Indiana Original application Aug. 15, 1955, Ser. No. 528,236. Divided and this application June 23, 1960, Ser. No. 38,362

3 Claims. (Cl. 324—74)

In the manufacture of watthour meters, exemplified by the well-known electric meters at homes, one of the most important steps is making the calibrating adjustment when the meter is otherwise substantially complete. It is obvious that a high degree of accuracy in this adjustment is necessary, inasmuch as the meter can be no more accurate than it is made by this adjustment, no matter how well the meter may be designed.

In this operation, the human factor has been very important. It is important both from the standpoint of the time required for each meter, which affects costs of manufacture, and the degree of accuracy attained. Of course, each manufacturer sets certain high standards of accuracy but some minute range of acceptability must inevitably be allowed. Whenever there is room for human interpretation of test results, there are likely to be occasional instances in which the interpretation was in error, with the result that a meter slips through which does not quite come up to the manufacturer's high standards.

According to the present invention, time is saved and substandard meters are avoided or minimized. In the preferred form, the human element is completely eliminated, the calibration being accomplished entirely automatically. In another form of the invention, the human element is minimized by a calibration checking system in which the need for human interpretation is substantially eliminated.

This application is a division of application Serial Number 528,236, filed August 15, 1955, issuing with claims to a related invention, and continuing from Serial Number 323,278, filed November 29, 1952.

In both inventions the meter to be calibrated or checked is compared with a standard meter, while both are operated by the same or correlated voltage and current supplies. In both instances, the production meter is a conventional meter and the comparison period is determined automatically by counting with the aid of an electric eye (using the conventional black mark or anti-creep holes of the disks) a given number of rotations of the production disk. During this given number of rotations, the exact amount of rotation of the standard meter is determined by an electric eye operating on light passing between teeth on the edge of the disk of the standard meter. In both inventions, the number of interruptions of a light beam by the teeth are, in effect, counted electrically, thus avoiding the mechanically driven indicators which have been a source of error.

In the calibration checking invention (Serial No. 528,236), the actual numerical count of the interruptions is shown in an electronic counter showing the digits. The operator need only read the number thus flashed and reject the previous calibration if the number is not within the range designated by the manufacturer as acceptable.

With the illustrated form of invention, accomplishing calibration, the count of interruptions is not reduced to a numerical value but is determined by a device such as a synchronous motor which rotates a divided contact disk a distance proportional to the count of interruptions. The divided contact disk will, unless it stops at a point indicating perfect accuracy of the production meter, establish one of two circuits to calibrate the production meter in one direction or the other, depending on whether it measured high or low. A calibrating motor then drives the calibration adjustment screw of the production meter and simultaneously turns the divided contact disk to the point at which it should have stopped, the adjustment of the calibration screw thus being proportional to the error of the meter.

Additional objects and advantages will be apparent from the following description and from the appended drawings.

Fig. 4 is a view similar to Fig. 1 but showing a modification described in the original application.

Figure 1:
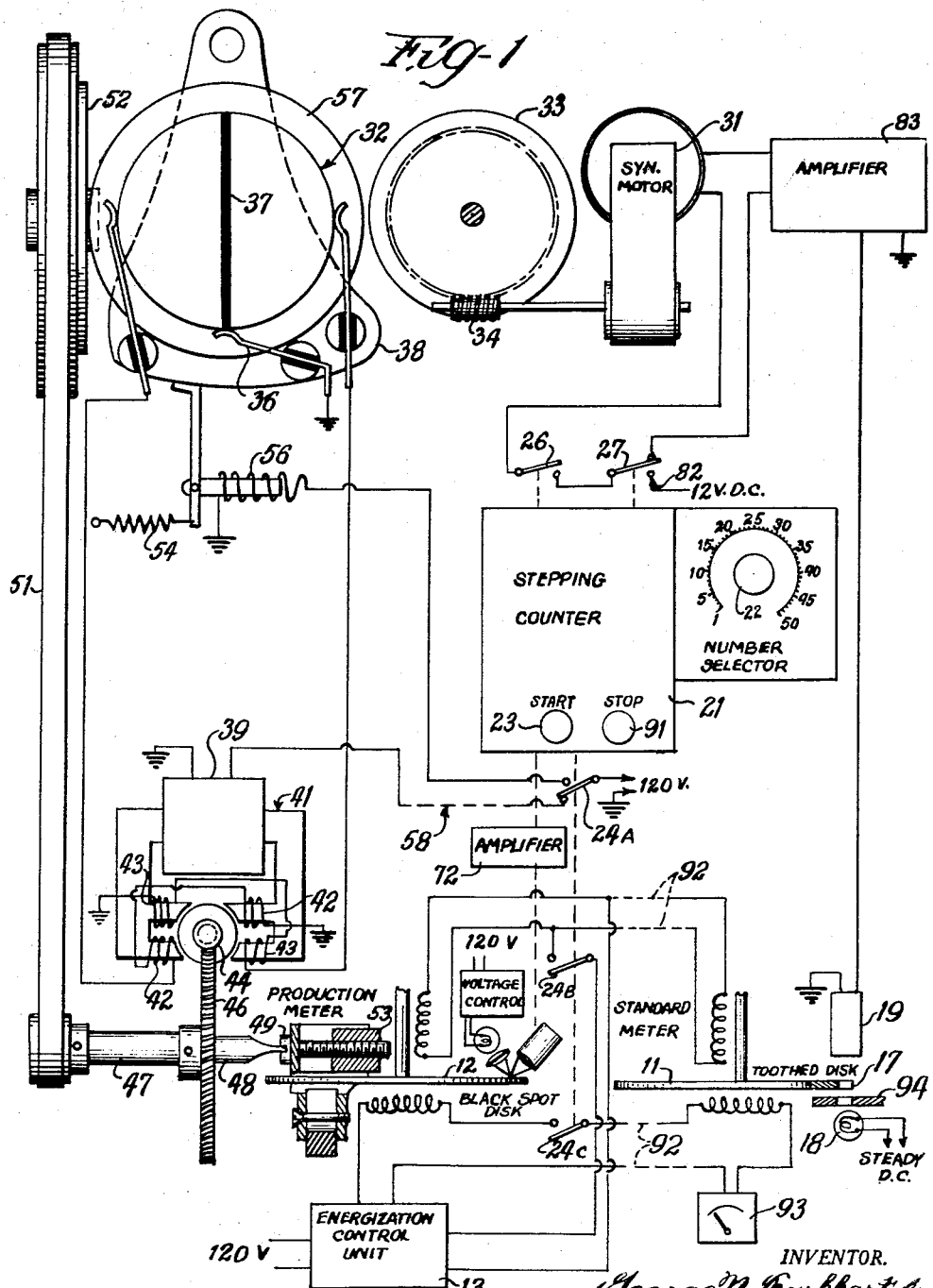
Fig. 1 is a schematic showing of the automatic calibrating form of the invention.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

*General operation of comparison*

The general operation of comparison can perhaps best be explained with reference to Fig. 2, inasmuch as it is in its entirety primarily a comparison apparatus. The standard meter represented by disk 11 is permanently mounted and connected. The production meter represented by disk 12 is mounted and connected in a manner to be easily replaced by successive production meters. An energization control unit 13 may be set, by means not shown, to energize both meters with the proper voltage and current load for any given test of a particular production meter. Production meters conventionally have on each disk a single large black mark at or near their peripheries. The number of rotations of the production meter disk may therefore be counted through the use of a photocell (electric eye) 14 actuated by a focused beam of light derived from a light bulb 16. Alternatively, the light may shine through the anti-creep holes, of which two are conventionally provided in each disk. In that event, two flashes would count one revolution. The standard meter disk 11 is provided with peripheral teeth 17 which interrupt a uniform beam of light from a light bulb 18, thus permitting a photocell 19 to detect and therefore count the number of teeth which pass a given point. The time during which this counting of teeth is effective is controlled by a stepping counter 21 which in turn is actuated by the photocell 14.

*General operation*

The energization control unit 13 is set to energize the production meter with approximately the desired voltage and current at approximately the desired power factor for a given test, and to energize the standard meter with the same or accurately correlated values. A number selector knob 22 associated with the stepping counter 21 is turned to the number of disk revolutions for which it is desired to compare the two meters. A starting button 23 on the stepping counter is pressed. This starts the stepping counter operating and through relay contacts 24B and C closes the circuits between the energization control units 13 and the meters. Each time the black mark on disk 12 passes through the focused beam of light, photocell 14 transmits an impulse to the stepping relay in counter 21, advancing this stepping counter one notch. The first step, in the illustrated form, is merely a preliminary or cocking step. The next impulse initiates both counting operations, namely, the counting of revolutions by stepping counter 21 and the counting of teeth by photocell 19. The beginning of tooth counting is effectuated by the closing of contact 26 when it is attracted by a relay within the stepping counter which, when the stepping counter is in its cocked position, is connected to receive the impulse derived from photocell 14.

When the stepping counter 21 has taken the number of steps from its cocked position for which the number selector 22 was set, it will have reached a position such that the next impulse derived from photocell 14 will operate a stopping relay. This will immediately attract contact 27 to discontinue the counting of teeth by interrupting the tooth counting circuit. At the same time, the stopping relay in stepping counter 21 will cause release of contacts 24B and 24C, opening the circuits to the meters, and will set in operation the homing circuits within the stepping counter 21 so that this counter will automatically continue to step until it reaches its home or starting position, at which position it will stop.

*Electronic counter*

When, with the comparison apparatus above described, an electronic counter 28 is used, the tooth-counting circuit controlled by contacts 26 and 27 extends to this counter. Such electronic counters are well known and it need only be mentioned that it may count the impulses at extremely high speed, each impulse raising by one the number indicated by the counter. Thus, in the preferred form of counter indicated, the first nine impulses will illuminate in succession the numerals 1 to 9 of the right-hand vertical row in electronic counter 28. When 2,435 impulses have been received by the electronic counter 28, the numerals 2, 4, 3 and 5 will be illuminated in successive vertical rows from left to right. When the counting is discontinued by operation of contact 27, the number then last illuminated remains illuminated until a reset circuit is closed. This gives the operator whatever time he may need to read the number indicated by counter 28. To reject or accept the calibration of the production meter just checked, he need only observe whether the number thus indicated on electronic counter 28 is within the range designated by the manufacturer as acceptable for the particular test which was run. As soon as the operator is ready for the next test, he presses the start button, starting again the cycle already described. In addition, this may cause closing of the contact 24A as shown in Fig. 2 to close the reset circuit for electronic counter 28. In Fig. 2, this reset circuit is immediately opened again by the contact of relay 29, which remains energized until contact 24A has opened. Alternatively contact 24A may be closed momentarily by the first (precount) pulse operating through relay 30 as in Fig. 3.

*Automatic calibrating*

The present invention relates to automatic calibrating. The automatic calibrating apparatus shown in Fig. 1 includes substantially all of the apparatus so far described with the exception of the electronic counter. In its place a synchronous motor 31 is provided. The synchronous motor 31 may be regarded as another high-speed impulse counter, although not of the digitary type, since it moves a predetermined amount for each impulse within the frequency range for which it may operate and with the substantially uniform frequency which inevitably results during each test from the method of operation here encountered. The synchronous motor 31 drives a divided contact disk 32. For purpose of illustration, this drive has been indicated as a friction drive, the drive disk 33 being driven through gears 34.

It is believed that this form of the invention will best be illustrated by describing the general operation of the schematically illustrated apparatus, although it should be borne in mind that the actual parts and their driving connections may be quite different from those illustrated.

*General operation of automatic calibrator*

As described under the previous General operation heading, the production meter is placed in position and connected, the energization control unit 13 is set for the particular test, and the start button 23 is pressed. Through the already-described operation of the stepping counter 21, contact 26 is closed to connect the tooth-counting circuit to the synchronous motor 31, thereby driving this synchronous motor by an amount equal to the number of teeth passing the photocell 19 during the comparison period, at the end of which the counting is interrupted by the opening of contact 27. During this comparison period, the synchronous motor 31 will have driven the divided contact disk 32 an amount proportional to the number of teeth passing the photocell 19. If the production meter is entirely accurate, the contact disk 32 will come to rest in the position shown in Fig. 1, or the diametrically opposite position, the center contact 36 in either event engaging only the insulating spacer 37. The fact that the contact disk 32 will stop in this position if the production meter is accurate results from the design of the apparatus and the number of revolutions of the disks chosen for the comparison period. In other words, the drive wheel 33 will be of such size that, with a given number of disk revolutions appropriate for a certain test, this number being chosen for that test by number selector knob 22, the contact disk 32 will come to rest as shown, assuming that it started as shown. In other words, for a given number of revolutions of the standard meter disk, the contact disk 32 will turn through a total movement equal to a given number of half-turns.

When the stepping counter 21 releases contact 27 and contacts 24B and C, as previously described, it also releases contact 24A. In the structure of Fig. 1, this accomplishes two results, namely, shifting the carriage 38 for the contact disk 32 and energizing the coil 39 of calibrating motor 41. The calibrating motor 41 is of the type that is reversible and which does not rotate in either direction unless either one of its pair of shading coils 42 or 43 is short-circuited. If the contact disk 32 is centered as shown, neither pair of shading coils will be short-circuited and the calibrating motor 41 will not turn. If the contact disk 32 is off-center, it will short-circuit either shading coils 42 or shading coils 43, depending on which way the contact disk 32 is off-center, thus driving the calibrating motor 41 in the correct direction for bringing the contact disk to its correct centered position and at the same time correctly calibrating the production meter. Thus the calibrating motor 41 through suitable gears 44 and 46 turns a spindle 47. This spindle 47 drives a screw-driver 48 for turning the calibration screw 49 of the production meter. The spindle 47 also, as through belt 51 and drive disk 52, drives contact disk 32.

The calibrating motor 41 continues to rotate until it has turned the contact disk 32 to the correctly centered position. At this time the center contact 36 rides onto the insulating spacer 37 and breaks the short-circuiting circuit which previously effectuated motor 41 and the motor comes to a stop. A ratio of drive between screw-driver 48 and contact disk 32 is such that when the contact disk has been turned to its correctly centered position, the adjustment screw 49 will have turned by an amount approximately correct for overcoming the inaccuracy of calibration indicated by the amount that the contact disk 32 was off-center when its drive was discontinued by opening of contact 27. If desired, which might be the case if there were a fairly extensive calibrating adjustment, the start button may again be pushed and the same cycle repeated with the same production meter. This time it may be expected that the contact disk 32 will come to rest, when contact 27 opens, either on or very close to the insulating divider 37. Minute variations in adjusting plugs 53 or other parts of successive meters may cause enough variation in the calibration change accomplished by a given number of turns of adjustment screw 49, so that a first adjustment will rarely be exactly the correct adjustment if the first adjustment is extensive.

The carriage 38 is urged toward the illustrated position by spring 54 and is urged in the opposite direction by solenoid 56 which is energized when contact 24A is actuated by stepping counter 21. Because contact 24A is actuated prior to the closing of the tooth-counting circuit by contact 26, there is time for the carriage 38 to shift so that contact disk 32 of its associated drive disk 57 is in firm engagement with the drive wheel 33 before the synchronous motor 31 starts rotating. It may be desirable to allow the carriage 38 time to shift in the opposite direction before the calibrating motor 31 becomes operative. This could be accomplished by a time-delayed relay, although for simplicity no such relay has been shown, the broken-line 58 being used to suggest that something may be interposed at this point. Alternatively, coil 39 could be energized through a home contact of stepping counter 21 instead of through contact 24A, the homing of the stepping counter then automatically providing the desired delay.

*Stepping counter*

Figure 2:
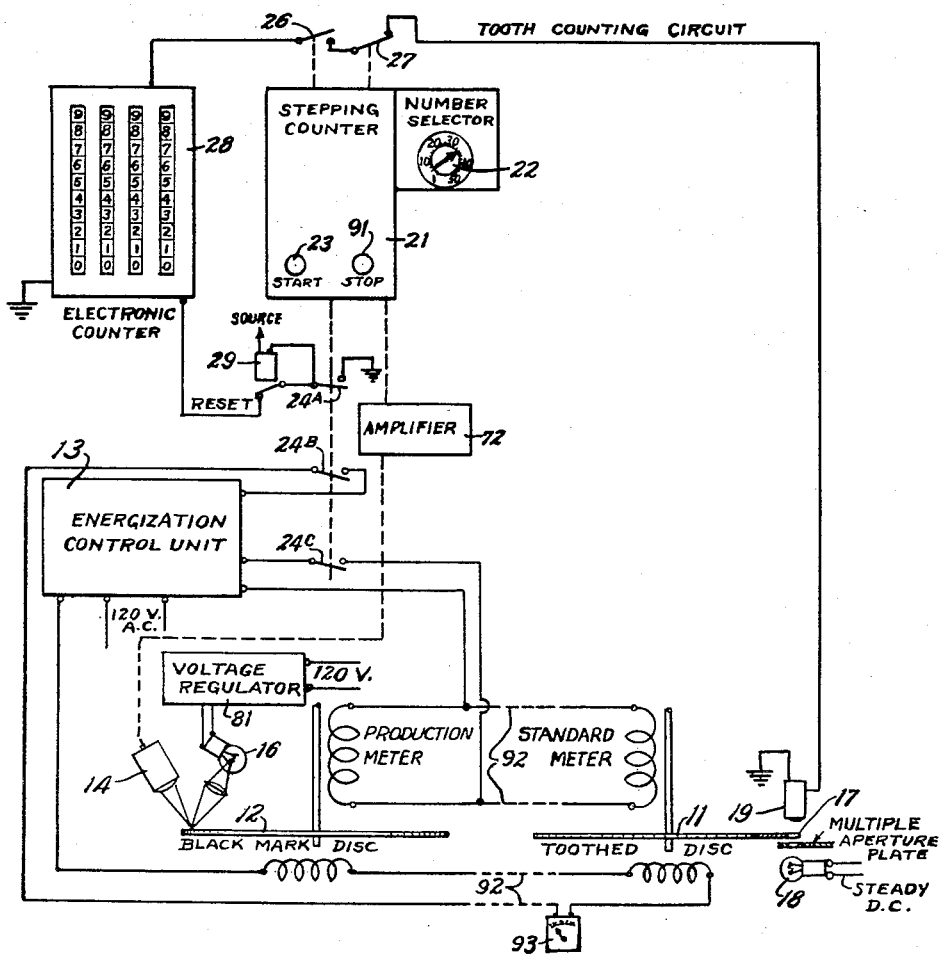
Fig. 2 is a similar view of one form of the automatic calibration checking invention of Serial No. 528,236.
Figure 3:
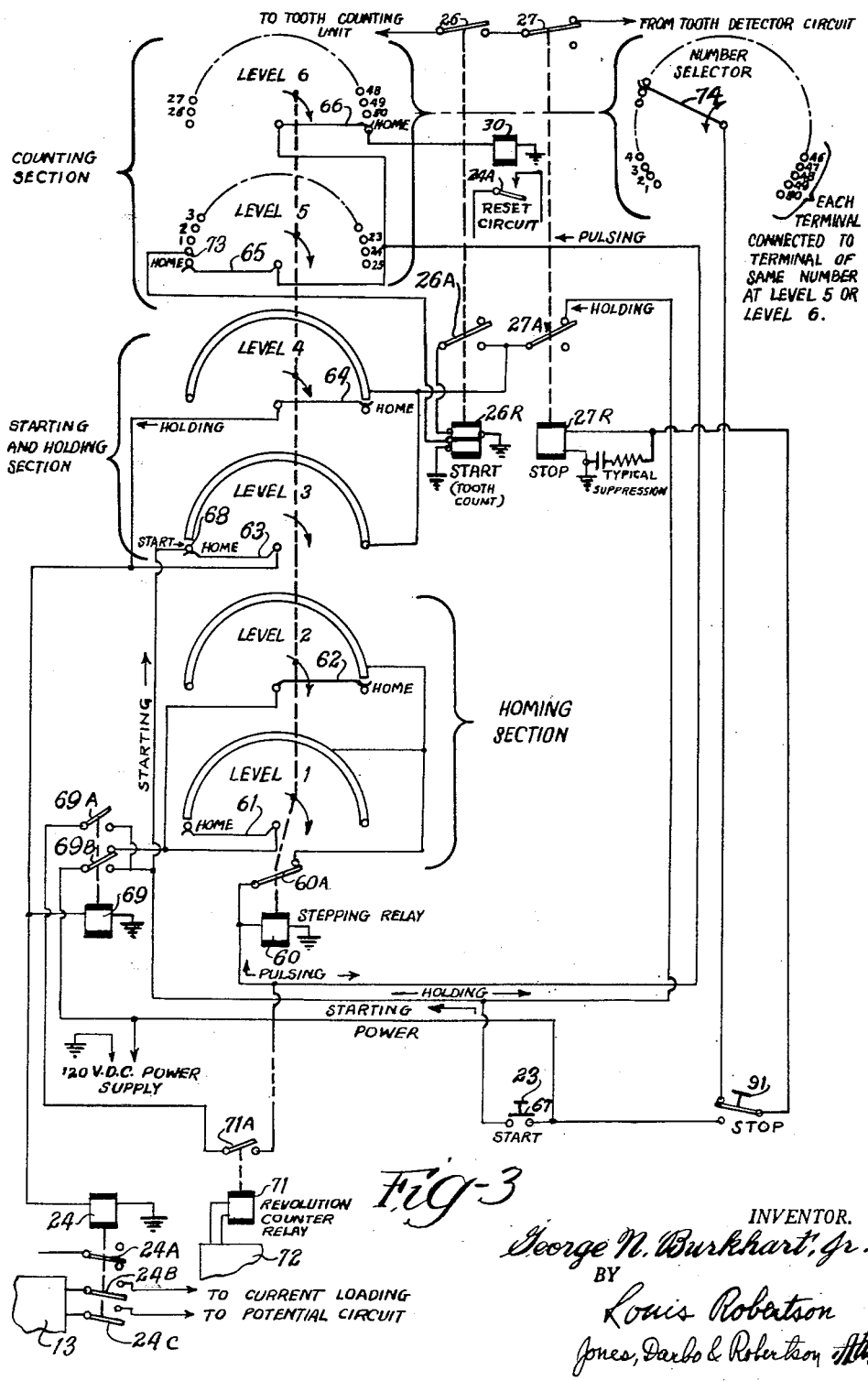
Fig. 3 is a schematic view of a stepping counter which may be used with either form of the invention for counting the revolutions of the production disk and controlling the associated devices.

One form of stepping counter, which can be used in both Figs. 1 and 2, is shown in Fig. 3. This has been developed by Mr. Russell F. Graefnitz of the Duncan Electric Mfg. Co., and is disclosed in application Serial No. 345,163, filed March 27, 1953, later abandoned. A major element of this stepping counter is a multilevel rotary stepping switch, such switches already being well known. This switch is represented in Fig. 3 by stepping relay 60 and the six arcuately arranged sets of contacts marked "Level 1" to "Level 6" and the contact arms 61 to 66 associated therewith. Where arcuate contact bars are shown, there may alternatively be separate terminals wired together. The contact arms 61 to 66 are shown in their respective home positions. They are all mounted on a common spindle which is actuated by a rachet mechanism to advance the contact one step each time the stepping relay 60 is actuated. Contacts 65 and 66 must be non-bridging, engaging only one of their associated fixed contacts at a time.

When starting button 23 is pressed, it closes contact 67. This completes a circuit from the source of power through contact 67 through the home terminal 68 at level 3 to relays 69 and 24. The relay 24 operates the contacts 24A, B and C for external circuits already described. The relay 69 shifts its contacts 69A and 69B from the homing and idle position illustrated in Fig. 1 to the running position. Power is thus supplied from the source of power through contacts 69B and 69A to a contact 71A of a revolution-counting relay 71. The relay 71, it should be understood, is actuated by photocell 14 with the aid of amplifier 72 (Figs. 1 and 2). When the black spot on disk 12 first interrupts the beam of light, the contact 71A momentarily closes and connects the source of power to stepping relay 60. The release of this relay at the end of the impulse steps the contact arms 61 to 66 from their home terminals to their cocked-position terminals from which the counting begins. The start of the next impulse caused by the black mark actuates starting relay 26-R (so that its contact 26 closes the tooth-counting circuit) and actuates stepping relay 60 to again step the stepping switch at the end of the impulse. The circuit for relay 26-R may be traced from the source of power through contacts 69A and B, contact 71A, contact arm 65 at level 5, terminal 73 and a pick-up coil of relay 26-R. As soon as contact 26A is actuated by its relay 26-R, it closes a holding circuit for relay 26-R which may be traced back through contact 69B to the source of power. Preferably this circuit energizes a separate coil of relay 26-R to avoid having to open the pick-up circuit by contact 26-A. This same holding circuit is extended, independently of contact 26-A, through all of the terminals of levels 3 and 4, except the home terminals and through either of the contact arms 63 or 64 to starting relay 69 and external control relay 24.

The comparison having now started, successive impulses derived from the black mark on disk 12 and the photocell 14 merely cause successive stepping of the stepping switch until the last counting step is reached. This last counting step is predetermined by positioning contact arm 74, which may be turned manually by number selector knob 22. Contact arm 74 connects the cut-off relay 27-R to any of the arcuately-disposed terminals corresponding to the numbers 1 to 50. Each of these number selecting terminals is connected, by wires not shown, to a correspondingly-numbered terminal in levels 5 and 6. Thus if number selecting contact arm 74 is turned to terminal number 24, it will connect relay 27-R to terminal 24 at level 5. The 24th black mark impulse, beginning the count with the impulse which actuated the starting relay 26-R, will step contact arm 65 into engagement with terminal 24, showing that the disk is now in its 24th comparison revolution. The black mark impulse at the end of this revolution will now be transmitted through the 24th terminal at level 5 and the 24th terminal of the number selector switch engaging contact arm 74 to the cut-off relay 27-R, thereby actuating contact 27 to open the tooth-counting circuit. This stops the electronic counter 28 in Fig. 2 or stops the synchronous motor 31 in Fig. 1.

At the same time relay 27-R actuates contact 27A to break the holding circuit. This de-energizes relay 26-R, releasing its contacts with no immediate effect, and also breaks the holding circuit through levels 3 and 4, thereby de-energizing relays 69 and 24. De-energizing relay 24 exerts the external controls already indicated. De-energizing relay 69 and the consequent retarded release of its contact 69A interrupt the supply of power to impulse contact 71A so that no further impulses are transmitted to the remainder of the mechanism. The release of contact 69B connects the source of power to contact arms 61 and 62 in levels 1 and 2. These levels comprise the homing section of the stepping switch. In these levels the arcuate terminal bars, or all of the terminals except the home terminals, are connected through contact 60A to stepping relay 60. A circuit from contact 69B is thus closed through level 1 or level 2, and through contact 60A to relay 60, which directly or indirectly actuates the stepping ratchet and also opens contact 60A to de-energize relay 60 so that it restores the ratchet mechanism for the next step and simultaneously closes contact 60A to again actuate stepping relay 60. This stepping of relay 60 is repeated until contact arms 61 and 62 reach their home terminals, at which time the apparatus comes to rest, these home terminals not being connected to the stepping relay 60.

It may be noted at this point that one of these home terminals could be used to energize coil 39 of calibrating motor 41, as previously described. It may be observed that the contact arms 61 to 66 are arranged in pairs. Thus the homing circuit can be completed through contact arm 61 during approximately the first half-revolution of the stepping switch. At that time the contact arm 62 will reach the left-hand end of its terminal bar as the contact arm 61 passes beyond the terminals of level 1.

Henceforth the homing circuit can then be completed through contact arm 62 until the home position is reached.

Although the tooth-counting circuit could be controlled by a single contact, such as contact 26, the use of two contacts is preferred so that there will be uniformity of timing at both the start and end of the count. Thus it will be observed that both contact 26 and contact 27 are effectuated by the energization of a relay, the two relays being uniform and being similarly energized so that their timing will be similar. For further uniformity, it is preferred that the light bulb 16 be supplied through a voltage regulator 81 of uniform output with each adjustment so that the change in the light voltage between the start and stopping of counting will not cause a change in brightness of illumination of the disk. Adjustability of the brightness is one way to obtain proper operation of the photocell. With constant illumination, it is apparent that the exact position at which the black mark sufficiently interrupts the reflected beam to cause an impulse will be the same on all revolutions of the disk. Direct current can be used for greater uniformity but is not believed to be essential here where there is no danger the 60-cycle A.C. effect will cause a serious cumulative error, there being only $\frac{1}{120}$ of a second between peaks of brightness, with moderate brightness between the peaks.

The use of the two contacts 26 and 27 is not alone enough to ensure uniformity at the beginning and end of the count in Fig. 1. This is because the synchronous motor 31 tends to coast and hence its stopping time may be considerably longer than its starting time. This is preferably overcome, however, by providing a low-voltage braking current for synchronous motor 31. Thus a contact 82 may be provided which through contact 27 will contact synchronous motor 31 to a D.C. voltage of 12 volts or whatever voltage is found necessary for stopping the synchronous motor 31 with a stopping time comparable to its starting time. A similar contact could be provided for the released side of contact 26 if relay 26–R releases quickly enough to make such additional contact necessary. It is not believed that this additional contact for contact 26 will be needed and, if not, contact 26 will desirably interrupt the flow of the braking current. Except for the desirability of using the direct current braking voltage, the contacts 26 and 27 could be connected in the portion of the tooth-counting circuit between photocell 19 and amplifier 83 in Fig. 1 as in Fig. 2.

*Further details*

If the start button 23 should be pressed erroneously or if anything should go wrong during a run, the stop button 91 may be pressed to supply power to stop relay 27–R and restore the apparatus to its starting position, stop button 91 also breaking the circuit through contact 74.

Instead of comparing only one production meter with the standard meter, as illustrated, a number of positions may be provided for production meters so that a number of them may be connected for simultaneous comparison with a standard meter. Of course, for each there should be a duplicate for virtually all of the apparatus shown except the standard meter, the photocell 19 and the energization control unit 13 and the start and stop buttons 23 and 91. In short, each production meter will have and control either its electronic counter 28 or the calibrating devices typified by motor 41. As a matter of fact, a meter can have both the calibration apparatus and the electronic counter, if this should be desired, the electronic counter enabling the operator to check occasionally on the accuracy of automatic calibration by noting the electronic counter after a repeat run. Also, unless automatic calibrating is provided for both full-load and light load, the electronic counter may be used for one of these for which automatic calibration is not provided. If a plurality of production meters are simultaneously compared to the standard meter, the comparing cycles may all be started by the same start button, after which the stepping counter for each of the production meters will then take control and start and stop the transmission to its own tooth-counting unit of the tooth impulses derived from photocell 19.

By shaping the cross section of calibrating plug 53, it is possible to provide straight-line calibration so that the number of turns of screw 49 required for accurate calibration will always be proportional to the error of calibration which in turn should be proportional to displacement of divided contact disk 32 from its centered position. The proper speed relationship between turning screw 49 and rotating divided contact disk 32 during calibration can be effectuated by any speed change device in the drive between them. For example, if a simple friction direct drive were used, as illustrated in Fig. 1, the speed ratio could be changed by moving the axis of friction disk 52 toward or from the eye. Indeed, if the apparatus should be used for meters which do not have straight-line calibration, a cam could be driven with divided contact disk 32 for effectuating a shifting of the axis of drive disk 52, in accordance with the displacement from center of the contact disk 32.

The energization control for the production meter and the standard meter have been considerably simplified as compared to the usual practice. The broken-line portions 92 are intended to suggest that there has been this simplification. In fact, there would be located at those positions transformers for forming part of energization control unit 13 to facilitate the use of a single standard meter with a wide variety of production meters. From the standpoint of understanding the invention, it may be assumed that the broken-line portions 92 are continuous. The ammeter 93 may be used as a guide in adjusting the load which the energization control unit applies to the meters for a given comparison. It may be observed at this point that unavoidable changes in either the current or the voltage which occur during a comparison run have no effect on the accuracy of the comparison. Indeed, that is an important reason for using the general method of calibration by comparison with a standard meter. It would be extremely difficult, if not impossible, to have such exact constancy of current and voltage that equal accuracy could be obtained in any manner other than the comparison method.

Although the number of teeth provided in disk 11 is largely a matter of choice, 200 has been found to give good results. The resulting teeth are rather fine and it is therefore preferred to use several spaces between them to actuate the passage of the cell 19. Accordingly, the light beam from light bulb 18 passes through a multiple-apertured plate 94, the apertures of which are so disposed that they are simultaneously blocked by the teeth 17 of tooth disk 11.

The purpose of providing the cocked position represented by contact 73 is to avoid any danger that less than a full revolution of the production meter light disk might be treated as a full revolution. This could occur but for the cocked position, if the start button 23 should be pressed while the black spot on the disk was already in the light beam slightly beyond the position at which it would initiate an impulse. With full-load comparisons, the time elapsed by allowing an extra disk rotation before the comparison period begins is not objectionable. If it proves objectionable for light-load comparisons, some other means can be provided for guarding against this short-revolution danger. For example, an added relay may be connected to open the pulsing circuit through contact 71A before the closing of contact 69A if contact 71A is closed, and hold this circuit open until contact 71A opens.

In place of the photoelectric tooth detector used in conjunction with the standard meter disk, other non-mechanical detectors can be used, such as electrostatic or inductance types.

Both inventions have been illustrated as basic systems. In practice, each would be used in a sequence of operations to test each meter with the conventional series of tests. Thus each production meter is calibrated first at unity power factor with full or heavy load and then at light load, and then at fifty percent power factor with full load. Once a meter has been mounted, it is preferably run through all three conditions of calibrating or check runs, without further human intervention. Thus a sequence control system may be interposed at 58 in Fig. 1 to cause repetition of each condition of calibrating, run until no further calibrating at that condition is necessary or a given degree of perfection reached, and then operate a sequence switch to shift the connections to another condition. A still more satisfactory sequence control would run full load and light load calibrations alternately (with one power factor) until both satisfied the standard degree of perfection, and then shift to the next condition. The shift between full and light load will normally connect a different terminal on the number selector, and cause a different unit to be controlled by contacts 26 and 27 and contact 24A. The first unit is represented in Fig. 1, the second unit would be similar but would control a calibrating screw connected to drive the light load adjustment screw. The third unit, in the absence of power factor adjustments on meters suitable for automatic calibration, would be a non-calibrating unit such as the electronic counter represented in Fig. 2. In this event a suitable change would also be made in the tooth counting circuit to correspond to Fig. 2 instead of Fig. 1.

If desired, two additional contacts 95 may be provided, as shown in Fig. 4, for the divided contact disk 32 (or a separate similar disk 96 mounted with it), these contacts being so located that they will be bridged if the disk is displaced, say, 45 degrees from the centered position shown. These may then be connected permanently or otherwise as a safety circuit in common with arm 65 and one of its terminals suitable for ending a comparison period (when the disk 32 would be centered if the production meter is accurate). For convenience of illustration this is indicated in Fig. 1 by the words "to Arm 79," that arm being connected as the previous sentence describes. This safety circuit may be connected to end the comparison period whenever effectuated, even though a longer comparison had been selected. Whether so used or not, it should preferably actuate a signal 97 to warn the attendant that the associated production meter has a relatively high error and may need special attention.

Instead of diametrically divided disk 32, axially displaced contact sectors or cams may be used as the comparison device, in which case (with relocation of contacts) they may be effective for displacements of approximately 180° instead of approximately 90° maximum from a "centered" position.

The synchronous motor 31 is of a self-starting type. When it is used, the amplifier which drives it is of course of a type having an alternating current output. The standard meter is conventionally driven at full load speed even when the production meter is being run at light load, so there will not be excessive frequency variation.

A spark-reducing and surge-suppressing condenser or condenser and resistance in series should be provided in parallel with each operating coil of the various relays actuated while the electronic counter circuit is closed to avoid spurious impulses which might affect the electronic counter. A typical example of such suppression has been shown by relay 27-R.

If the electronic counter used requires some other reset control than grounding, appropriate changes may be made in the contacts controlled by relay 24.

A mechanical register may be used to supplement the electronic counter to show the higher-place digits for long comparison periods. It would be advanced a number through a relay by the next pulse after the highest indication on the electronic counter, the electronic counter simultaneously returning to "0" to start over.

Among the types of electronic counter which may be used, one found satisfactory is that available on the market as the "Berkeley Electronic Counting Unit, Model 700," of the Berkeley Scientific Company, Richmond, California.

From the foregoing, it will be recognized that the invention minimizes both human and equipment error. Human interpretations are avoided. Inaccuracy due to differences in starting and stopping times of the meters are completely eliminated. The indicator or register heretofore often used with standard meters has been avoided, thus eliminating the possibility of difficulties or errors arising from the fact it could not be driven at "low gear" and had to have reset springs which would sometimes break.

Invention is claimed as follows:

1. Automatic calibrating apparatus including means for correlatedly energizing a production meter and a standard meter, both having rotating elements, a comparison device, means for actuating the comparison device in proportion to the number of circumferential demarcations on the rotating element of the standard meter which pass a given point during a test run controlled by the production meter to the duration of a movement thereof calculated to stop the comparison device in a given status if the number of demarcations passing is the number indicating accurate measurement by the production meter, a motor controllable by said comparison device after the counting has been completed to actuate the comparison device to said status, and means actuated by said motor in accordance with its movement while actuating the comparison device for operating the calibrating adjustment of the production meter.

2. Automatic calibrating apparatus according to claim 1 in which the motor is a reversible motor controlled in its direction of movement by the comparison device according to whether its status is to one side or the other of the given status.

3. Automatic calibrating apparatus including means for correlatedly energizing a production meter and a standard meter, a comparison device, means for actuating the comparison device in proportion to the number of circumferential demarcations on a rotating element of the standard meter which pass a given point during a test run controlled by the production meter to the duration of a load thereof calculated to stop the comparison device at a given status if a number of demarcations passing is a number within a predetermined range representing acceptably accurate measurement by the production unit, and means controlled by said comparison device to cause a signal indication if the comparison device does not stop in said given status and to respond otherwise if the comparison device stops within the given status.

References Cited in the file of this patent

UNITED STATES PATENTS

| | | |
|---|---|---|
| 2,601,492 | Baker | June 24, 1952 |
| 2,606,956 | Axebrod | Aug. 12, 1952 |
| 2,693,991 | Holtz | Nov. 9, 1954 |
| 2,938,165 | Greig | May 24, 1960 |

OTHER REFERENCES

A.I.E.E. Transactions, volume 74, part I, July 1955, pp. 367–373.